Jan. 23, 1962 C. A. BIRD 3,017,653
PORTABLE TRASH COLLECTING DEVICES
Filed Jan. 25, 1960
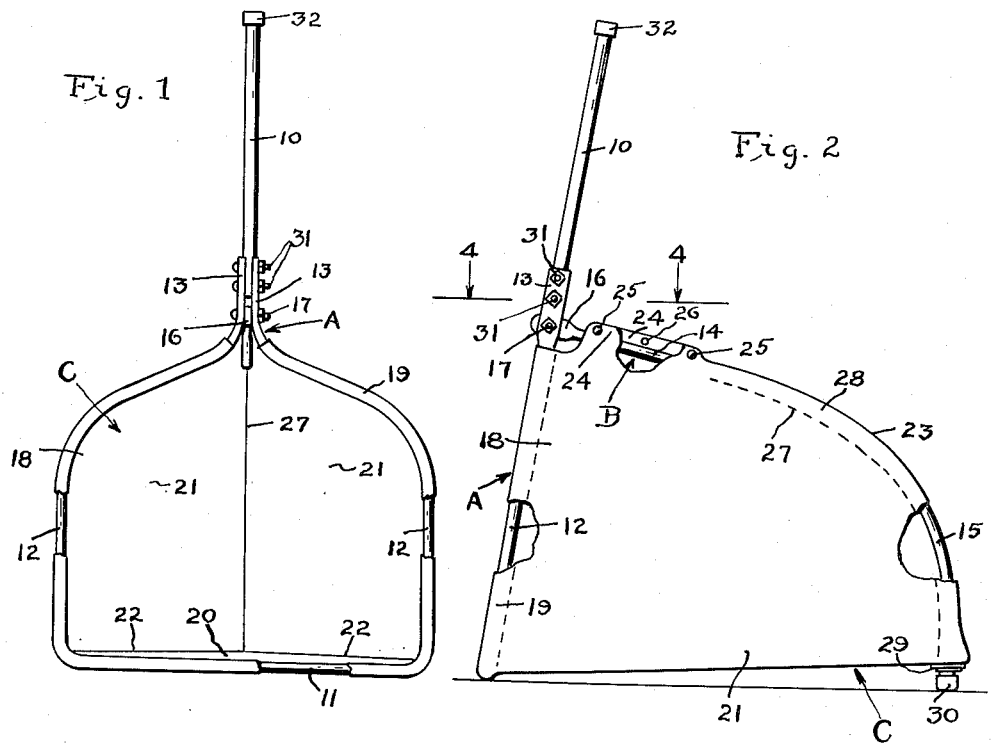
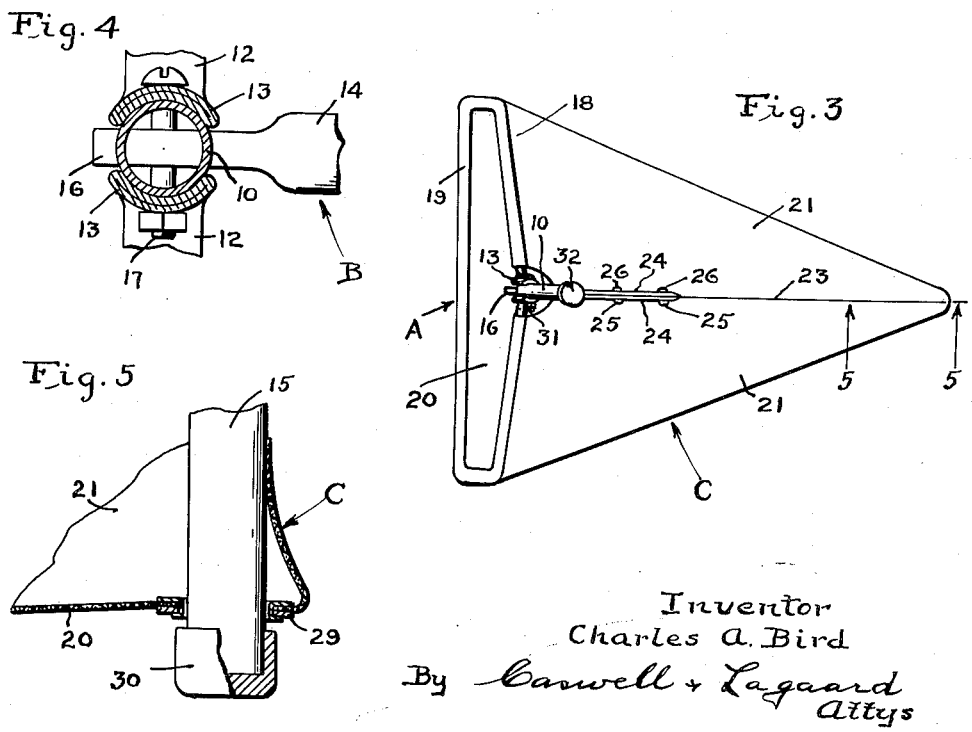
Inventor
Charles A. Bird
By Caswell + Lagaard
Attys

United States Patent Office 3,017,653
Patented Jan. 23, 1962

3,017,653
PORTABLE TRASH COLLECTING DEVICES
Charles A. Bird, 5341 Grand Ave., Minneapolis 19, Minn.
Filed Jan. 25, 1960, Ser. No. 4,362
4 Claims. (Cl. 15—257.8)

My invention relates to improvements in portable trash collecting devices, particularly, though not exclusively, for employment in the hands of a user engaged in collecting grass clippings, leaves, twigs and other accumulations of trash from a lawn.

Desirably, a device as above noted will be simple, durable, light in weight and relatively inexpensive in construction. It will be conveniently used in picking up trash and it will be collapsible to the end that when in use it will trap collected trash therein as it is carried from place to place, and when not in use it will take compact form for convenient storage.

Objectives of my invention are to provide an improved device meeting effectively all of the desiderata aforesaid.

With the foregoing and other objects in view, which will appear in the following description, the invention resides in the novel combination and arrangement of parts and/or in the details of construction hereinafter described and claimed.

In the accompanying drawing:

FIGURE 1 is a front elevational view of a portable trash collecting device constructed in accordance with my invention, the same being shown erected in expanded form for the reception of materials.

FIGURE 2 is a side elevational view of the structure shown in FIGURE 1.

FIGURE 3 is a plan view of the structure shown in FIGURES 1 and 2.

FIGURE 4 is a sectional view in detail taken as on the line 4—4 of FIGURE 2.

FIGURE 5 is a detail sectional view taken as on the line 5—5 of FIGURE 3.

Reference being had to the drawing, it will be seen that the form of the invention illustrated therein includes a front frame A, a back frame B, a bag C and a handle 10.

The front frame A is a length of tubular material, preferably aluminum tubing. This tubular front frame member A is fashioned to provide a base reach 11 intermediately thereof for footing on the ground. Upstanding from said base reach 11 are side reaches 12 the upper portions of which converge toward each other. Continuing coextensively upward from said side reaches 12 of said front frame A are relatively spaced terminal extensions 13. In these extensions 13, the tubular material is flattened and shaped transversely in arcuate formation as best seen in FIGURE 4.

The back frame B consists of a length of tubing which extends rearwardly and downwardly from the front frame A, said back frame B having a front ridge portion 14 and a rear leg portion 15 for footing on the ground. The forward end of the ridge portion 14 of the back frame B is flattened, as at 16, and received between the upstanding terminal extensions 13 of the side reaches 12 of the front frame A. A bolt 17 extending through said terminal extensions 13 and also through said flattened end 16 of the back frame B pivotally attaches said back frame to the front frame A.

The bag C may be made of fabric or other suitable material, canvas having been found to be satisfactory. Said bag C is attached at its mouth portion 18 to the front frame A, a hem 19 being formed in the bag C for the reception of the base reach 11 and side reaches 12 of said front frame A. The bag C tapers from its mouth to the rear of the front frame A and may be conveniently constructed of three triangular sections, namely, a lower section 20 constituting the bottom side of the bag C and side sections 21 which are stitched at their lower edges to the bottom section 20, as along the lines 22 (FIGURE 1), and which at their upper edges are additionally stitched to each other (line 23, FIGURES 2 and 3), except at the proximity of the mouth of the bag where the adjacent marginal portions 24 of said side sections 21 are supplied with companion snap fastener members 25 and 26 which releasably fasten together said side marginal portions 24 of said side sections 21. These side sections 21 of the bag C are further stitched together by stitching 27 (FIGURE 2), adjacent the line 23 of joinder between said side sections 21, to provide a hem 28 for the reception of the back frame B, the leg portion 15 of which at its lower end extends through a grommet 29 located at the apex of the bottom triangular section 20 of the bag C. Preferably, a foot in the form of a cap 30 is applied to the lower extremity of said leg portion 15 of the back frame. Placement of the back frame B in the topside hem 28 of the bag C, and the fastening together of the fastener members 25, 26 over said back frame B attaches the bag C along its upper side to the back frame B, whereby the bag C will be held in open expanded condition when the base reach 11 of the front frame A and the leg portion 15 of the back frame B are grounded. The bottom section 20 forming the lower side of the bag C constitutes a tie between the leg portion 15 of the back frame B and the base reach 11 of the front frame A which prevents the buckling of said frames when the device rests upon the ground. This tie between the front and back frames A, B, constituted by the lower side of the bag C, enables the front frame A to take position in a plane canted rearwardly of the device as seen in FIGURES 2 and 3. This provision lends stability to the device when the bag is grounded for the reception of material, as will be readily comprehended.

The handle 10, desirably, is a length of tubing and it upstands from the front frame A in the plane of said frame. The lower end of the handle 10 is received between the transversely arcuated extensions 13 of the side reaches 12 of said front frame A and it is secured to said extensions 13 by bolts 31 which extend through said extensions 13 and handle 10. Desirably, the upper end of the handle 10 will be provided with a cap 32.

The bag C is fabricated apart from the front and back frames A, B, said frames being threaded into their respective hems 19 and 28 on assembling the components of the device. In applying the front frame A to the hem 19 at the mouth of the bag C, the fastener members 25, 26 are left unfastened from each other allowing the marginal portions 24 of the bag's side sections 21 to spread apart, thereby enabling the assembler to thread the front frame A through the hem 19 at the bag's mouth. Having applied the back frame B to the topside hem 28 of the bag C, the snap fastener members 25, 26 are fastened together over the ridge portion 14 of said back frame B and the flattened forward end 16 of said back frame B is pivotally attached to the front frame extensions 13 by the bolt 17. The handle 10 is then applied to said extensions 13 and secured thereto by the bolts 31.

The device, placed on the ground in use remains erect by itself with the bag C expanded and open at its mouth for the reception of materials to be raked or swept thereinto. On lifting the device by the handle 10 for movement thereof from place to place the body of the bag C, along with the back frame B, swings downwardly by gravity relative to the front frame A tending to trap in the bag C the material previously deposited therein.

In disuse, the device may be conveniently suspended by its handle 10 with the front frame A disposed flatwise against a wall. In such case, the body of the bag C swings downwardly along with the back frame B and becomes collapsed as bag and back frame seek position depending from the front frame A. Thus, the device is self rendered into compact form for storage purposes.

Changes in the specific form of my invention, as herein disclosed, may be made within the scope of what is claimed without departing from the spirit of my invention.

Having described my invention, what I claim as new and desire to protect by Letters Patent is:

1. In a portable trash collecting device, the combination of a front frame, a back frame, a bag and a handle, the front frame comprising a base member for footing on the ground, and side members upraised from said base member; and converging at their upper portions toward each other, said side members having upwardly continuing coextensive terminal portions, the back frame being an elongated member extending rearwardly and downwardly from the front frame, said back frame having a ridge portion received at its forward end between said terminal portions of the front frame and pivotally attached thereto, said back frame having a leg portion in continuation of its ridge portion for footing on the ground, said bag having a hem at the mouth thereof in which the base member and side members of the front frame are received, said bag having a second hem extending along its upper portion in which the back frame member is received, said handle upstanding from the front frame, the lower end of said handle being received between said terminal portions of the front frame and attached thereto.

2. In a portable trash collecting device, the combination of a front frame, a back frame foldable relative to the front frame, a bag of flexible material carried by said frames, and a handle, the front frame comprising a base member for footing on the ground and side members upraised from the base member, said side members having upper portions inturned toward each other and having coextensive terminal portions extending upwardly from said inturned portions, the back frame extending rearwardly and downwardly from the front frame and pivotally attached at its front end to the terminal portions of said front frame, said back frame having a rear leg portion for footing on the ground, said bag being attached about its mouth portion to the base member of the front frame and to the side members thereof and their inturned upper portions, said bag being further attached along its upper side portion to said back frame, said handle being attached to said terminal portions of the front frame, said back frame being downwardly swingable by gravity relative to the front frame thereby collapsing the bag against the back of the front frame, said back frame being swingable upwardly relative to the front frame thereby expanding the bag, said bag tying said frames together and constituting a limit stop arresting the upward bag-expanding movement of the back frame relative to the front frame, said bag being supported in forwardly opening expanded condition by said front and back frames when the base member of the frame and leg portion of the latter are grounded.

3. A device, as defined in claim 2, wherein the front frame occupies a rearwardly canted plane in grounded disposition of said frames.

4. A device, as defined in claim 3, wherein the handle extends upwardly from the front frame and occupies the plane of said front frame.

References Cited in the file of this patent
UNITED STATES PATENTS

| | | |
|---|---|---|
| 2,705,644 | Stelzer | Apr. 5, 1955 |
| 2,860,360 | Leavelle | Nov. 18, 1958 |